United States Patent [19]

Kawanami

[11] Patent Number: 5,652,923
[45] Date of Patent: Jul. 29, 1997

[54] LENS DRIVING DEVICE

[75] Inventor: Akihiro Kawanami, Tokyo, Japan

[73] Assignee: Canon Kabushiki Kaisha, Tokyo, Japan

[21] Appl. No.: 343,633

[22] Filed: Nov. 22, 1994

[30] Foreign Application Priority Data

Nov. 30, 1993 [JP] Japan .................................. 5-323323

[51] Int. Cl.$^6$ .............................. G03B 1/18; G03B 3/00; G03B 13/18
[52] U.S. Cl. .................................. 396/87; 396/81; 396/85; 396/72; 396/280
[58] Field of Search ............................... 354/195.1, 402; 396/280, 87, 81, 72, 85

[56] References Cited

U.S. PATENT DOCUMENTS

| 5,057,859 | 10/1991 | Ishimaru | 354/195.1 |
| 5,210,562 | 5/1993 | Miyazawa et al. | 354/195.1 |
| 5,359,381 | 10/1994 | Miyazawa et al. | 354/195.1 |
| 5,416,559 | 5/1995 | Uenaka | 354/402 |

*Primary Examiner*—Russell E. Adams
*Assistant Examiner*—Michael Dalakis
*Attorney, Agent, or Firm*—Robin, Blecker, Daley & Driscoll

[57] ABSTRACT

The present invention provides a lens driving device, such as an automatic focusing device, which is arranged to detect a difference (the amount of overrun) between a given target amount of driving of a lens and an amount in which the lens is actually driven in a lens driving cycle, correct the next target amount of driving of the lens according to data formed by the accumulation of difference information on the detected difference, and drive the lens by the target amount corrected in this manner, thereby effecting lens driving which takes the past amount of overrun into account.

10 Claims, 15 Drawing Sheets

FIG. 3

| ACCUMULATED DRIVING TIME (HOUR) | PREDICTED AMOUNT OF OVERRUN (NUMBER OF PULSES) |
|---|---|
| 0 ~ 500 | 00 |
| 500 ~ 1000 | 01 |
| 1000 ~ 1500 | 02 |
| 1500 ~ 2000 | 03 |
| 2000 or more | 04 |

FIG.5

| ACCUMULATED NUMBER OF TIMES OF DRIVING (NUMBER OF TIMES) | PREDICTED AMOUNT OF OVERRUN (NUMBER OF PULSES) |
|---|---|
| 0 ~ 5000 | 00 |
| 5000 ~ 10000 | 01 |
| 10000 ~ 15000 | 02 |
| 15000 ~ 20000 | 03 |
| 20000 or more | 04 |

FIG.12

| SWITCH SETTING PART | PREDICTED AMOUNT OF OVERRUN (NUMBER OF PULSES) |
|---|---|
| 00 | 03 |
| 01 | 02 |
| 10 | 01 |
| 11 | 00 |

LENS DRIVING DEVICE

BACKGROUND OF THE INVENTION

1. Field of the Invention

The present invention relates to an improvement in an automatic focusing device which is provided with driving means for driving a focusing lens, amount-of-driving detecting means for detecting the amount of driving of the focusing lens, and the like. The automatic focusing device may be disposed in an automatic focusing lens unit, or partly in the automatic focusing lens unit and partly in a camera (body).

2. Description of the Related Art

It has heretofore been common practice to manually bring a subject into focus during photography using a camera. In recent years, however, products such as autofocus cameras or autofocus lens units have become highly popular. In such products, an actuator, such as a DC motor or an ultrasonic motor, is provided in a camera (body) or a lens unit so that focusing can be automatically performed by directly moving a focusing lens. Accordingly, the accuracy of focusing is improved and the time required to achieve an in-focus state is greatly reduced, so that even a beginner can easily take a satisfactory photograph without missing a shutter opportunity.

However, the current autofocus cameras which have been improved in focusing speed over conventional manual-focus products have encountered the problem that an increased risk of abrasion of a moving part due to friction or the like occasionally leads to an impairment in mechanical durability. In the case of such an autofocus product, as the initial performance is gradually degraded, the probability that the focusing lens is driven over and over again during a focusing operation becomes higher. In the worst case, a hunting phenomenon may occur in focusing and it may become impossible to focus a subject.

In addition, if the autofocus product continues to be used for a long time, a mechanical looseness or the like increases in the focusing part of the lens unit, with the result that the reliability of focusing accuracy may become low.

In addition, if a user sends such a product to a manufacturer for repair, the components of the focusing part of the lens unit will have to be replaced and the user will have to pay a considerable repairing charge.

SUMMARY OF THE INVENTION

One object of the present invention is, therefore, to provide a driving arrangement which is capable of predicting mechanical error factors due to a long-term use of an object driving device and automatically correcting a mechanical error or enabling easy maintenance for correcting the mechanical error, thereby making it possible to maintain its initial operating state and always accurately drive an object.

Another object of the present invention is to provide a driving arrangement capable of accurately controlling the amount of driving of an object by controlling an amount in which to drive the object, on the basis of history information obtained from object driving cycles prior to an object driving cycle to be currently performed, or to provide a lens driving device including such a driving arrangement.

Another object of the present invention is to provide a driving arrangement which is arranged to memorize, as history information, the amount of error, such as overrun, which occurs each time an object is driven toward a target position of driving or by a target amount of driving, and control a position toward which or an amount by which the object is to be driven, on the basis of the history information, or to provide a lens driving device including such a driving arrangement.

Another object of the present invention is to provide a driving arrangement which is arranged to predict an error which will occur during driving of an object, according to the existing driving period of time or the existing number of times of driving, and execute driving of the object while taking account of the predicted error, or to provide a lens driving device, such as an autofocus device, including such a driving arrangement.

Another object of the present invention is to provide a driving arrangement which is arranged to switchably preset errors which will occur during driving of an object, thereby controlling the driving of the object while taking account of a set error, or to provide a lens driving device, such as an autofocus device, including such a driving arrangement.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a data table of an accumulated driving time, which is used in the operation shown in FIG. 4;

FIG. 5 is a data table of the accumulated number of times of driving, which is used in the operation shown in FIG. 6;

FIG. 12 is a data table of the amount of accumulated overrun, which is used in the operation shown in FIG. 13;

DETAILED DESCRIPTION OF THE PREFERRED EMBODIMENTS

Preferred embodiments of the present invention will be described below with reference to the accompanying drawings.

(First Embodiment)

Figure 1:
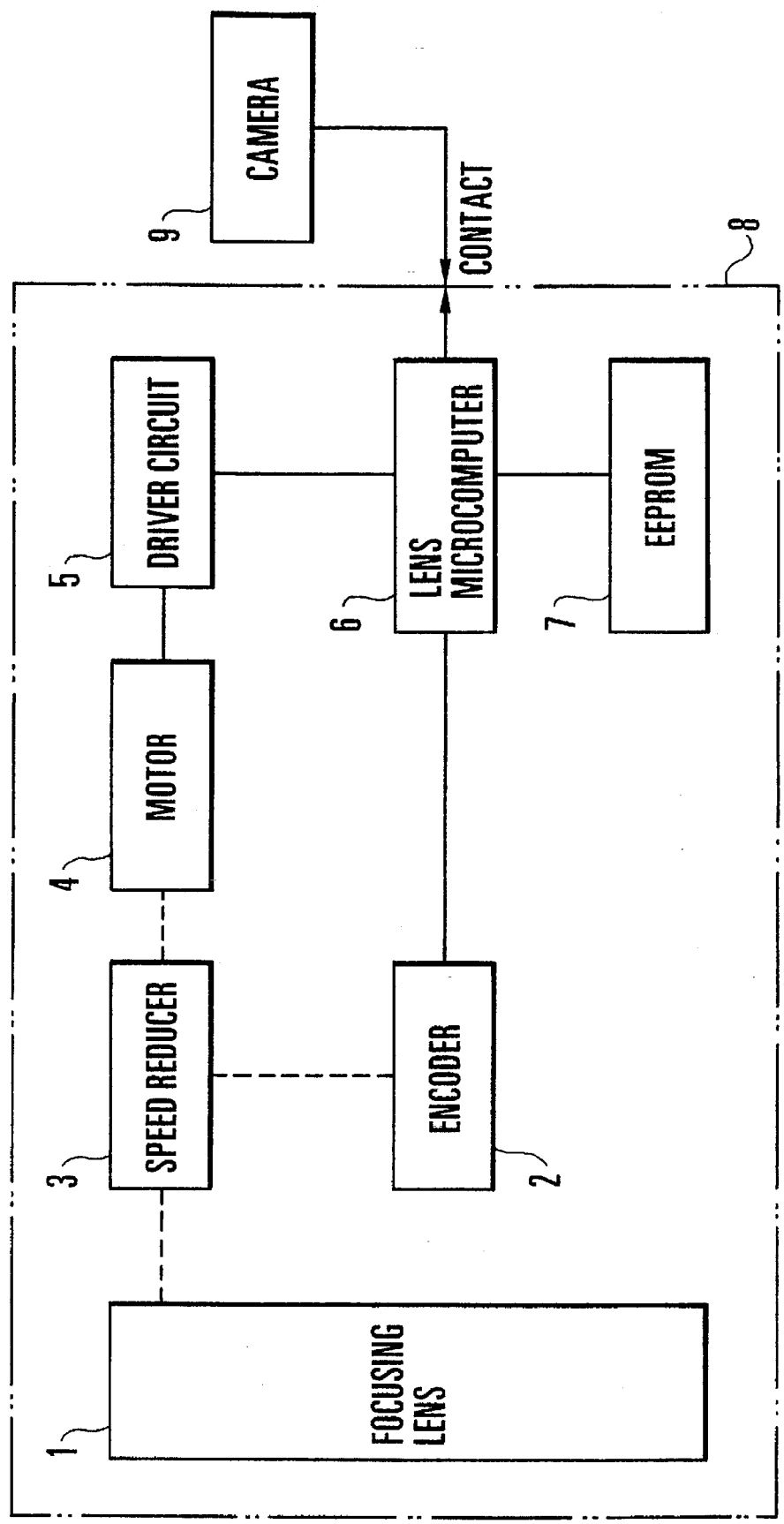
FIG. 1 is a block diagram showing the arrangement of a camera system provided with an automatic focusing device according to a first embodiment of the present invention.

FIG. 1 is a block diagram showing the arrangement of a camera system provide with an automatic focusing device according to a first embodiment of the present invention. In the first embodiment, a lens unit is provided with an actuator.

The arrangement shown in FIG. 1 includes a focusing lens 1 which constitutes a focusing optical system, an encoder 2 for detecting the amount of driving of the focusing lens 1, a speed reducer 3 for decreasing the speed of rotation of and increasing the torque of a power source, a motor 4 which constitutes the power source for moving the focusing lens 1, a driver circuit 5 for driving the motor 4, a lens microcomputer 6 for controlling all elements of a lens unit 8, and an electrically erasable memory element (EEPROM) 7 for storing various histories of the lens unit 8 or various data thereabout. The lens unit 8 is made up of the above-described elements, i.e., the focusing lens 1, the encoder 2, the speed reducer 3, the motor 4, the driver circuit 5, the lens microcomputer 6 and the EEPROM 7.

In FIG. 1, reference numeral 9 denotes a camera (body) which is arranged to transmit various commands or data to the lens unit 8 and control the lens unit 8 itself.

In FIG. 1, solid lines represent electrical connections, and dotted lines represent mechanical connections.

The outlines of the respective operations of the camera 9 and the lens unit 8 will first be described below.

If an instruction to execute automatic focusing is inputted to the camera 9 by an external manipulation, the camera 9 outputs a data transmission request to the lens microcomputer 6 and starts a distance measuring operation.

The lens microcomputer 6 transmits lens data to the camera 9 in response to the data transmission request, and waits for the next request.

When completing the distance measuring operation, the camera 9 computes an amount in which to drive the focusing lens 1, on the basis of the transmitted lens data, and transmits to the lens microcomputer 6 a lens driving request and the computed amount in which to drive the focusing lens 1.

When the lens microcomputer 6 receives the lens driving request and the computed amount in which to drive the focusing lens 1, the lens microcomputer 6 reads the amount of past accumulated overrun from the EEPROM 7 and subtracts the read amount of past accumulated overrun from the amount in which to drive the focusing lens 1, which amount has been transmitted from the camera 9. The lens microcomputer 6 substitutes the resultant difference for a new amount in which to drive the focusing lens 1, and drives the motor 4 via the driver circuit 5 to start driving the focusing lens 1.

When the driving of the focusing lens 1 is completed, the lens microcomputer 6 compares the output (count value) of the encoder 2 with the new amount in which to drive the focusing lens 1, and finds their difference (which corresponds to an amount of overrun which has occurred at this time). The lens microcomputer 6 then computes an average of this amount of overrun and the amount of past accumulated overrun, stores the average in the EEPROM 7 as a new amount of accumulated overrun, and completes driving the focusing lens 1.

Figure 2:
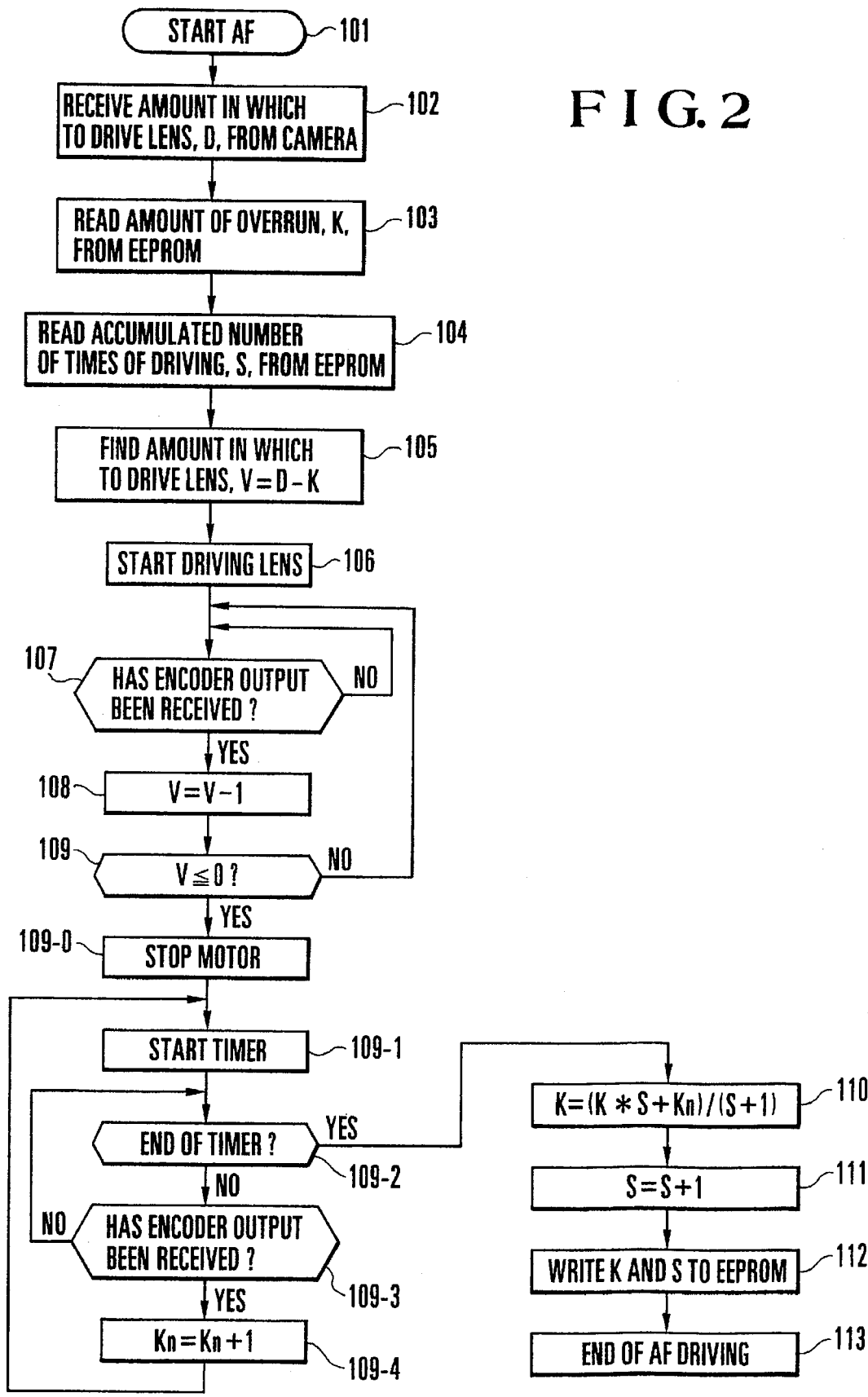
FIG. 2 is a flowchart showing the operation of a lens microcomputer of FIG. 1 which includes the step of memorizing an average value of the amounts of overrun.

The operation of the lens unit 8 (the lens microcomputer 6) will be described be in detail with reference to the flowchart of FIG. 2.

If the lens unit 8 receives from the camera 9 an instruction to drive the focusing lens 1 and an amount D in which to drive the focusing lens 1 (Steps 101 and 102), the lens microcomputer 6 reads an amount of overrun, K, and an accumulated number of times of driving, S, from the EEPROM 7 (Steps 103 and 104). The lens microcomputer 6 subtracts the amount of overrun, K, from the amount D in which to drive the focusing lens 1, which amount D has been received from the camera 9, thereby finding a new amount V in which to drive the focusing lens 1 (Step 105). Then, the lens microcomputer 6 starts driving the focusing lens 1 (Step 106).

Subsequently, the lens microcomputer 6 monitors the output of the encoder 2 at all times (Step 107). If the output of the encoder 2 switches from its high level to its low level or vice versa, the lens microcomputer 6 performs a computation on V−1 (Step 108). Then, it is confirmed whether the relation of V≦0 is satisfied (Step 109). If V>0, Steps 107 and 108 are repeated. If the relation of V≦0 is satisfied, the motor 4 is made to stop and a timer is made to start. If the lens microcomputer 6 receives the output of the encoder 2 before the timer times out, a count value Kn is incremented by one and Steps 109-1 to 109-4 are repeated. If the output of the encoder 4 is not received, the process proceeds to Step 110, in which this amount of overrun, kn, is used to calculate an average amount of overrun. Then, the accumulated number of times of driving, S, is incremented by one (Step 111). The updated accumulated number of times of driving, S, and the amount of overrun, K, are written to the EEPROM 7 (Step 112), and the process is brought to an end (Step 113).

The above-described lens unit 8 is an example of the type in which the amount of accumulated overrun is stored in the EEPROM 7.

The type in which an accumulated driving time value is stored in the EEPROM 7 will be described below with reference to FIG. 1.

If an instruction to execute automatic focusing is inputted to the camera 9 by an external manipulation, the camera 9 outputs a data transmission request to the lens microcomputer 6 and starts a distance measuring operation.

The lens microcomputer 6 transmits lens data to the camera 9 in response to the data transmission request, and waits for the next request.

When completing the distance measuring operation, the camera 9 computes an amount in which to drive the focusing lens 1, on the basis of the transmitted lens data, and transmits to the lens microcomputer 6 a lens driving request and the computed amount in which to drive the focusing lens 1.

When the lens microcomputer 6 receives the lens driving request and the computed amount in which to drive the focusing lens 1, the lens microcomputer 6 reads the past accumulated driving time value from the EEPROM 7, confirms the area of a preset data table (to be described later) in which the read, past accumulated driving time value is contained, and determines data corresponding to the confirmed area, as the amount of overrun. The lens microcomputer 6 subtracts the amount of overrun read from the data table from the amount in which to drive the focusing lens 1, which amount has been transmitted from the camera 9. The lens microcomputer 6 substitutes the resultant difference for a new amount in which to drive the focusing lens 1, and drives the motor 4 via the driver circuit 5 to start driving the focusing lens 1. A time which elapses during the driving of the focusing lens 1 is measured, and when the driving of the focusing lens 1 is completed, the measured value of the elapsed time is added to the accumulated driving time value to prepare a new accumulated driving time value. The new accumulated driving time value is stored in the EEPROM 7, and the lens microcomputer 6 completes driving the focusing lens 1.

FIG. 3 is an example of the data table which is preset in the lens microcomputer 6.

As can be seen from FIG. 3, assuming that the amount in which to drive the focusing lens 1, which amount has been transmitted from the camera 9, is one hundred pulses and that the accumulated driving time of the focusing lens 1 is eight hundred hours, the amount of overrun is one pulse. Therefore, the lens microcomputer 6 determines that (100–1=99) pulses are an actual amount in which to drive the focusing lens 1.

Figure 4:
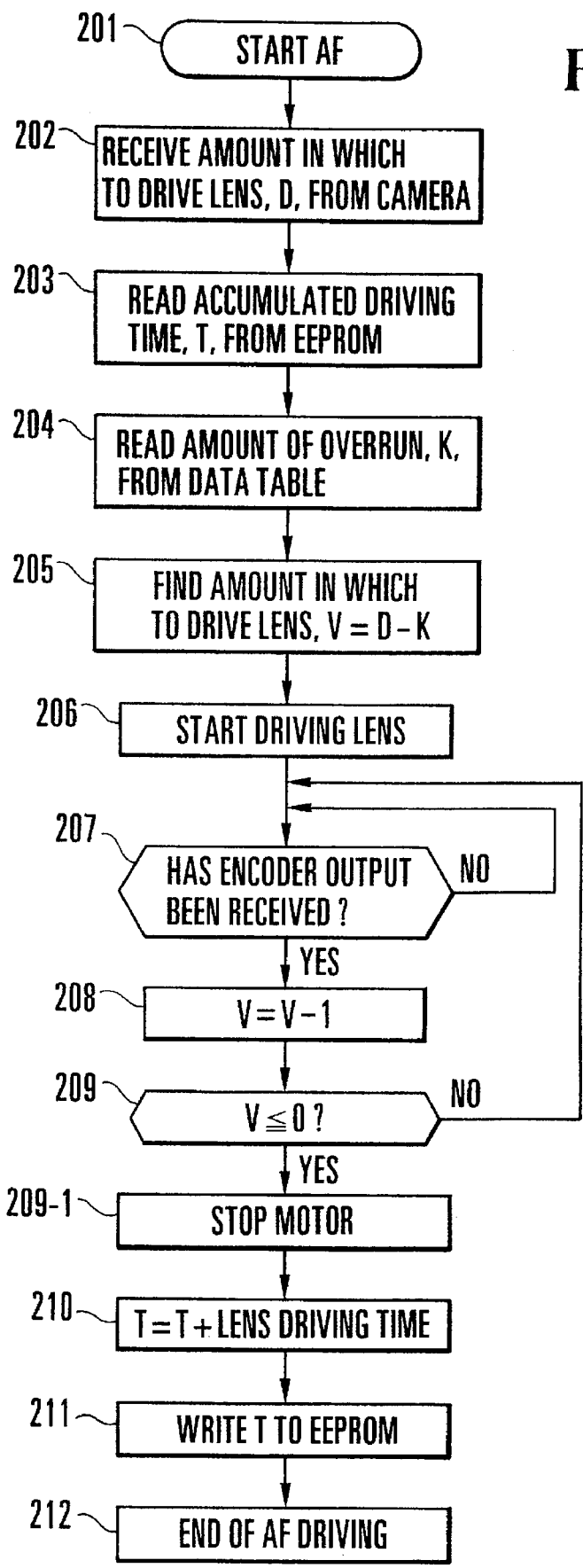
FIG. 4 is a flowchart showing the operation of the lens microcomputer of FIG. 1 which includes the step of memorizing the accumulated driving time of a focusing lens.

The operation of the lens unit 8 (the lens microcomputer 6) of the above-described type will be described below in detail with reference to the flowchart of FIG. 4.

If the lens unit 8 receives from the camera 9 an instruction to drive the focusing lens 1 and the amount D in which to drive the focusing lens 1 (Steps 201 and 202), the lens microcomputer 6 reads an accumulated driving time T from the EEPROM 7 (Step 203) and reads the amount of overrun, K, from the preset data table (refer to FIG. 3) (Step 204). Then, the lens microcomputer 6 subtracts the amount of overrun, K, from the amount D in which to drive the focusing lens 1, which amount D has been received from the camera 9, thereby finding the new amount V in which to drive the focusing lens 1 (Step 205). Then, the lens microcomputer 6 starts driving the focusing lens 1 (Step 206).

Subsequently, the lens microcomputer 6 monitors the output of the encoder 2 at all times (Step 207). If the output of the encoder 2 switches from the high level to the low level or vice versa, the lens microcomputer 6 performs a computation on V–1 (Step 208). Then, it is confirmed whether the relation of V≦0 is satisfied (Step 209). If V>0, Steps 207 and 208 are repeated. If the relation of V≦0 is satisfied, the motor 4 is made to stop (step 209.1) and the lens microcomputer 6 reads the count value of a timer provided therein and adds this lens driving time to the accumulated driving time T (Step 210). The accumulated driving time T is written to the EEPROM 7 (Step 211), and the lens driving flow is brought to an end (Step 212).

The type in which an accumulated number of times of driving is stored in the EEPROM 7 will be described below with reference to FIG. 1.

If an instruction to execute automatic focusing is inputted to the camera 9 by an external manipulation, the camera 9 outputs a data transmission request to the lens microcomputer 6 and starts a distance measuring operation.

The lens microcomputer 6 transmits lens data to the camera 9 in response to the data transmission request, and waits for the next request.

When completing the distance measuring operation, the camera 9 computes an amount in which to drive the focusing lens 1, on the basis of the transmitted lens data, and transmits to the lens microcomputer 6 a lens driving request and the computed amount in which to drive the focusing lens 1.

When the lens microcomputer 6 receives the lens driving request and the computed amount in which to drive the focusing lens 1, the lens microcomputer 6 reads the past accumulated number of times of driving from the EEPROM 7, confirms the area of a preset data table (to be described later) in which the read, past accumulated number of times of driving is contained, and determines data corresponding to the confirmed area, as the amount of overrun. The lens microcomputer 6 subtracts the amount of overrun read from the data table from the amount in which to drive the focusing lens 1, which amount has been transmitted from the camera 9. The lens microcomputer 6 substitutes the resultant difference for a new amount in which to drive the focusing lens 1, and drives the motor 4 via the driver circuit 5 to start driving the focusing lens 1. When the driving of the focusing lens 1 is completed, the number of times of driving, i.e., "1", is added to the accumulated number of times of driving to prepare a new accumulated number of times of driving. The new accumulated number of times of driving is stored in the EEPROM 7, and the lens microcomputer 6 completes driving the focusing lens 1.

FIG. 5 is an example of the data table which is preset in the lens microcomputer 6.

As can be seen from FIG. 5, assuming that the amount in which to drive the focusing lens 1, which amount has been transmitted from the camera 9, is one hundred pulses and that the accumulated number of times of driving of the focusing lens 1 is eight thousand, the amount of overrun is one pulse. Therefore, the lens microcomputer 6 determines that (100–1=99) pulses are an actual amount in which to drive the focusing lens 1.

Figure 6:
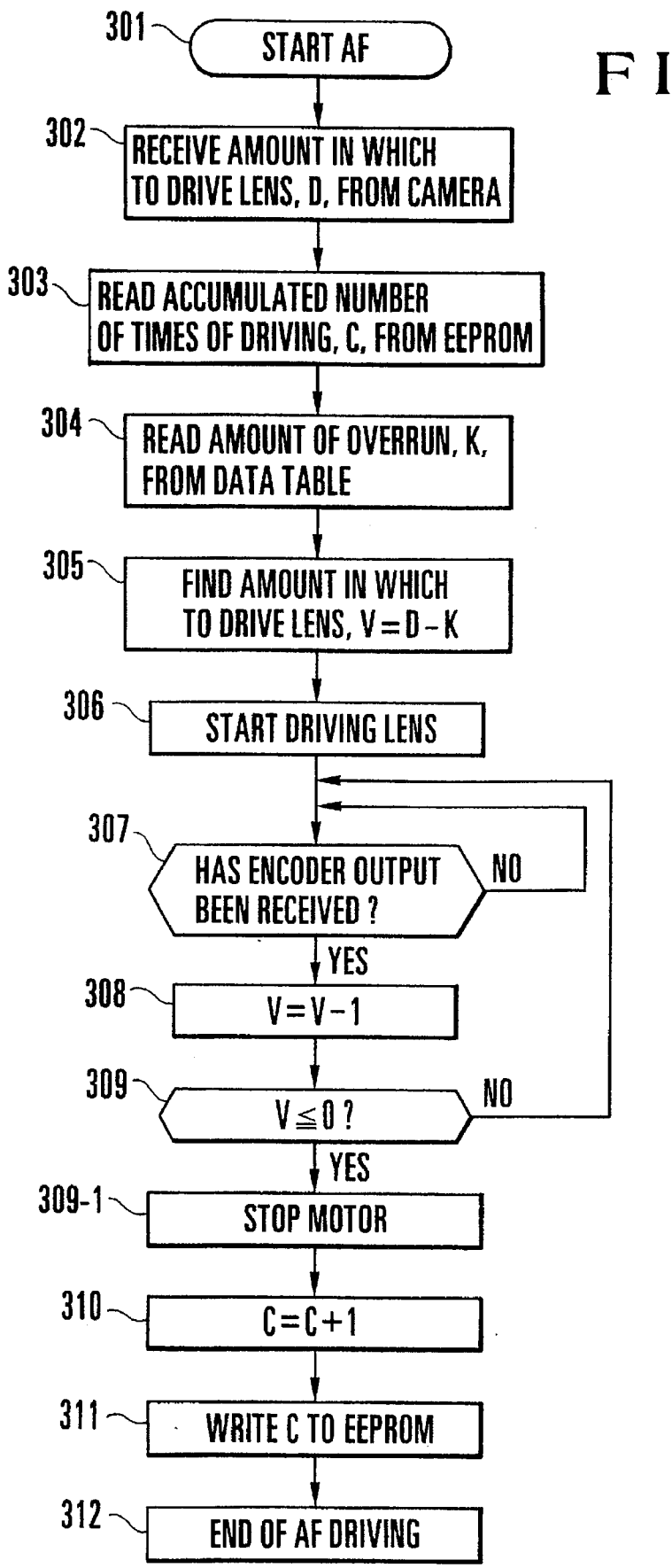
FIG. 6 is a flowchart showing the operation of the lens microcomputer of FIG. 1 which includes the step of memorizing the accumulated number of times of driving of the focusing lens.

The operation of the lens unit 8 (the lens microcomputer 6) of the above-described type will be described below in detail with reference to the flowchart of FIG. 6.

If the lens unit 8 receives from the camera 9 an instruction to drive the focusing lens 1 and the amount D in which to drive the focusing lens 1 (Steps 301 and 302), the lens microcomputer 6 reads an accumulated number of times of driving, C, from the EEPROM 7 (Steps 303) and reads the amount of overrun, K, from the preset data table (refer to FIG. 5) (Step 304). Then, the lens microcomputer 6 subtracts the amount of overrun, K, from the amount D in which to drive the focusing lens 1, which amount D has been received from the camera 9, thereby finding the new amount V in which to drive the focusing lens 1 (Step 305). Then, the lens microcomputer 6 starts driving the focusing lens 1 (Step 306).

Subsequently, the lens microcomputer 6 monitors the output of the encoder 2 at all times (Step 307). If the output of the encoder 2 switches from the high level to the low level or vice versa, the lens microcomputer 6 performs a computation on V–1 (Step 308). Then, it is confirmed whether the relation of V≦0 is satisfied (Step 309). If V>0, Steps 307 and 308 are repeated. If the relation of V≦0 is satisfied, the lens microcomputer 6 stops the motor 4 (Step 309-1) and increments the accumulated number of times of driving, C, by one (Step 310). The new accumulated number of times of driving, C, is written to the EEPROM 7 (Step 311), and the lens driving flow is brought to an end (Step 312).

(Second Embodiment)

Figure 7:
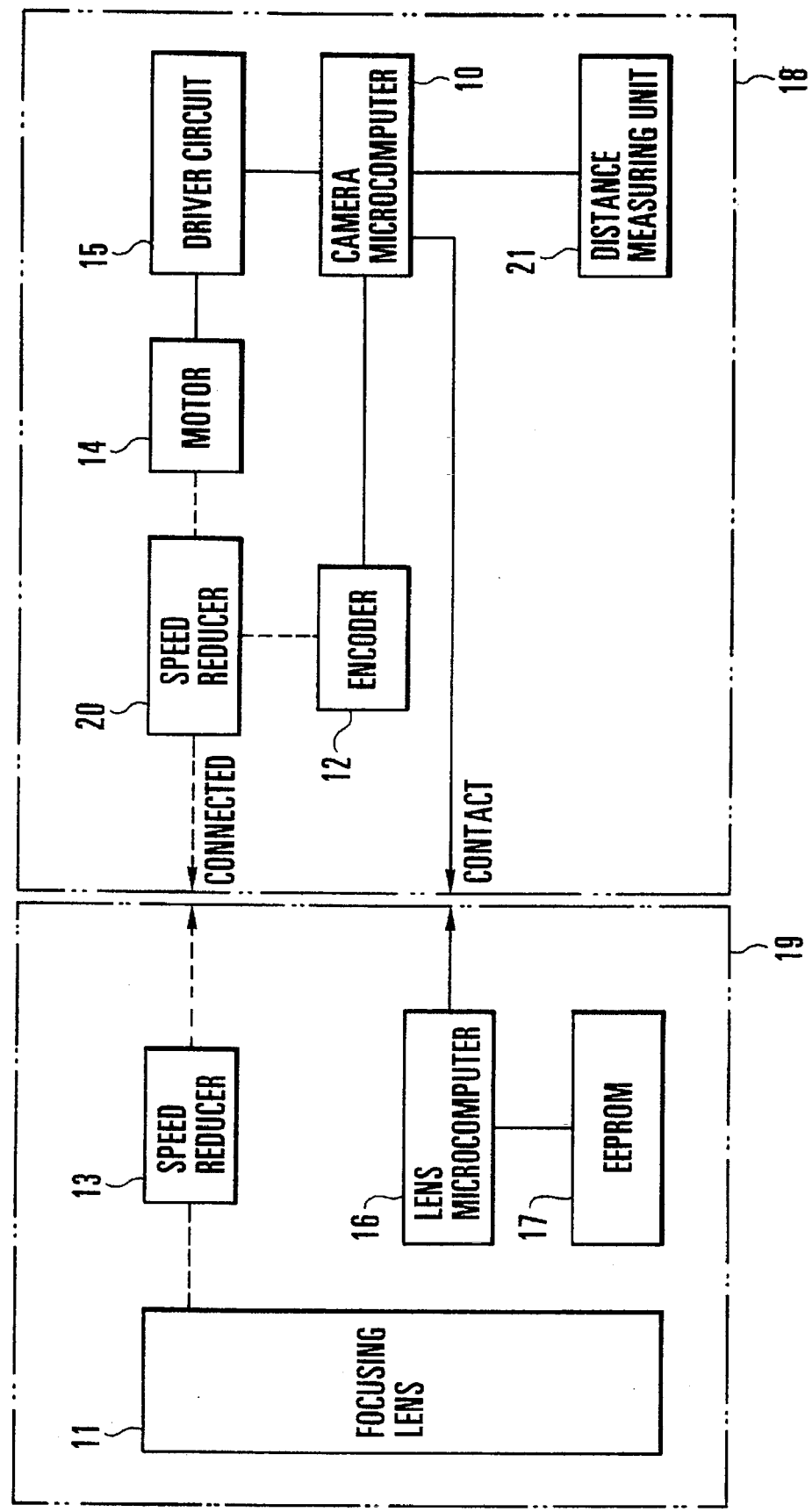
FIG. 7 is a block diagram showing the arrangement of a camera system provided with an automatic focusing device according to a second embodiment of the present invention.

FIG. 7 is a block diagram showing the arrangement of a camera system provide with an automatic focusing device according to a second embodiment of the present invention. In the second embodiment, a camera (body) is provided with an actuator.

The arrangement shown in FIG. 7 includes a camera microcomputer 10 for controlling all elements of a camera 18, a focusing lens 11 which constitutes a focusing optical system, an encoder 12 for detecting the amount of driving of the focusing lens 11, a speed reducer 13 for decreasing the speed of rotation of and increasing the torque of a power source provided in the camera 18, the power source being connected to the speed reducer 13 via a mount, a motor 14 which constitutes the power source for moving the focusing lens 11, a driver circuit 15 for driving the motor 14, a lens microcomputer 16 for controlling all elements of a lens unit 19, and an electrically erasable memory element (EEPROM) 17 for storing various histories of or various data about the lens unit 19.

The camera (body) 18 transmits various commands or data to the lens unit 19 to control the lens unit 19 itself. A speed reducer 20 and a distance measuring unit 21 for automatic focusing are incorporated in the camera 18.

In FIG. 7, solid lines represent electrical connections, and dotted lines represent mechanical connections.

If an instruction to execute automatic focusing is inputted to the camera microcomputer 10 by an external manipulation, the camera microcomputer 10 outputs a data transmission request to the lens microcomputer 16 and starts a distance measuring operation by means of the distance measuring unit 21.

The lens microcomputer 16 transmits lens data to the camera microcomputer 10 in response to the data transmission request, and then reads the amount of past accumulated overrun from the EEPROM 17 and transmits the read amount of past accumulated overrun to the camera microcomputer 10.

When completing the distance measuring operation, the camera microcomputer 10 computes an amount in which to drive the focusing lens 11, on the basis of the transmitted lens data, and drives the motor 14 by means of the driver circuit 15. The power of the motor 14 is transmitted to the focusing lens 11 via the speed reducer 20, a mount connector (not shown) and the lens-side speed reducer 13, and works as a force for driving the focusing lens 11. After that, if the camera microcomputer 10 detects the completion of the driving of the focusing lens 11, the camera microcomputer 10 compares the output (count value) of the camera microcomputer 10 with the computed amount in which to drive the focusing lens 1, finds a difference therebetween, computes an average value of the difference and the amount of past accumulated overrun, and transmits the average value to the lens microcomputer 16 as a new amount of accumulated overrun.

The lens microcomputer 16 stores the received data in the EEPROM 17. At this time, the camera microcomputer 10 completes driving the focusing lens 11.

Figure 8:
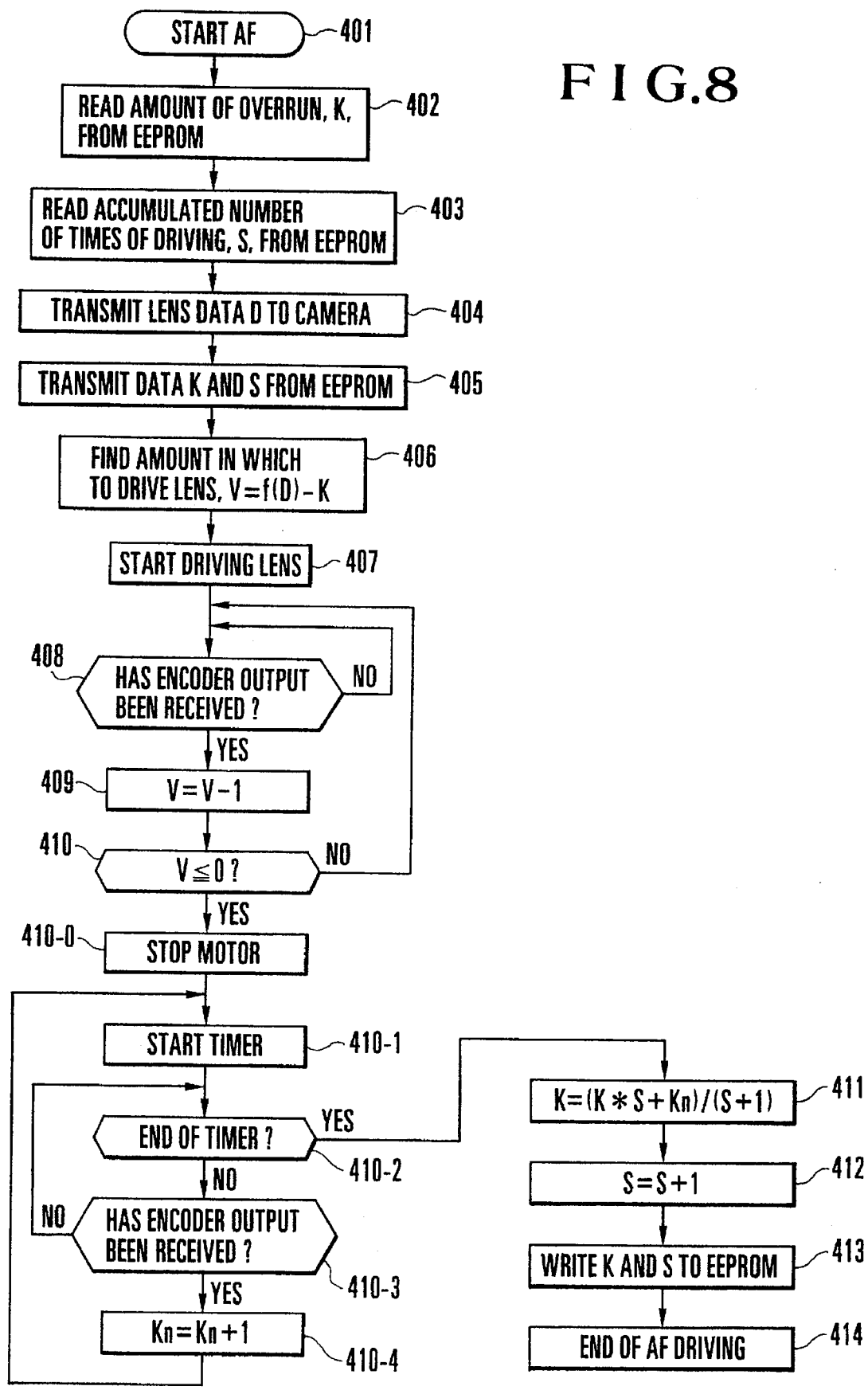
FIG. 8 is a flowchart showing the respective operations of lens and camera microcomputers of FIG. 7, which include the step of memorizing an average value of the amounts of overrun.

The respective operations of the lens unit 19 and the camera 18 (i.e., the respective operations of the lens microcomputer 16 and the camera microcomputer 10) will be described below in detail with reference to the flowchart of FIG. 8.

If an instruction to start automatic focusing is inputted to the camera 18 by an external manipulation, the camera microcomputer 10 transmits a data transmission request to the lens microcomputer 16 via a contact and also activates the distance measuring unit 21 (Step 401). The lens microcomputer 16 reads the amount of overrun, K, and the accumulated number of times of driving, S, from the EEPROM 17 (Steps 402 and 403), and transmits the amount of overrun, K, and the accumulated number of times of driving, S, as well as lens data, to the camera microcomputer 10 (Steps 404 and 405). The camera microcomputer 10 calculates the amount V in which to drive the focusing lens 11, by using a function f, on the basis of the output of the distance measuring unit 21 and the transmitted lens data. The camera microcomputer 10 then subtracts the amount of overrun K from the amount V in which to drive the focusing lens 11, thereby finding a new amount V in which to drive the focusing lens 11 (Step 406). The camera microcomputer 10 starts driving the focusing lens 11 (starts the motor 14) (Step 407).

Subsequently, the camera microcomputer 10 monitors the output of the encoder 12 at all times (Step 408). If the output of the encoder 12 switches from the high level to the low level or vice versa, the camera microcomputer 10 performs a computation on V−1 (Step 409). Then, it is confirmed whether the relation of $V \leq 0$ is satisfied (Step 410). If V>0, Steps 408 and 409 are repeated. If the relation of $V \leq 0$ is satisfied, the camera microcomputer 10 calculates an average value of the amount of overrun, K, (Step 411) and increments the accumulated number of times of driving, S, by one (Step 412). The lens microcomputer 16 writes the updated accumulated number of times of driving, S, and the amount of overrun, K, to the EEPROM 17 (Step 413). The camera microcomputer 10 brings the process to an end (Step 414).

The above description has referred to an example of the type in which the amount of accumulated overrun is stored in the EEPROM 17.

The type in which an accumulated driving time value is stored in the EEPROM 17 will be described below with reference to FIG. 7.

If an instruction to execute automatic focusing is inputted to the camera microcomputer 10 by an external manipulation, the camera microcomputer 10 outputs a data transmission request to the lens microcomputer 16 and starts a distance measuring operation by means of the distance measuring unit 21.

The lens microcomputer 16 transmits lens data to the camera microcomputer 10 in response to the data transmission request, and then reads the past accumulated driving time from the EEPROM 17, compares the read, past accumulated driving time with a data table provided in the lens microcomputer 16 to determine the amount of overrun, and transmits the amount of overrun to the camera microcomputer 10.

When completing the distance measuring operation, the camera microcomputer 10 computes an amount in which to drive the focusing lens 11, on the basis of the transmitted lens data and the amount of overrun, and drives the motor 14 by means of the driver circuit 15. The power of the motor 14 is transmitted to the focusing lens 11 via the speed reducer 20, the mount connector (not shown) and the lens-side speed reducer 13, and works as a force for driving the focusing lens 11. After that, if the camera microcomputer 10 detects the completion of the driving of the focusing lens 11, the camera microcomputer 10 transmits a lens driving time to the lens microcomputer 16.

The lens microcomputer 16 adds the lens driving time to an accumulated lens driving time and writes the sum to the EEPROM 17. Also, the camera microcomputer 10 completes driving the focusing lens 11.

Figure 9:
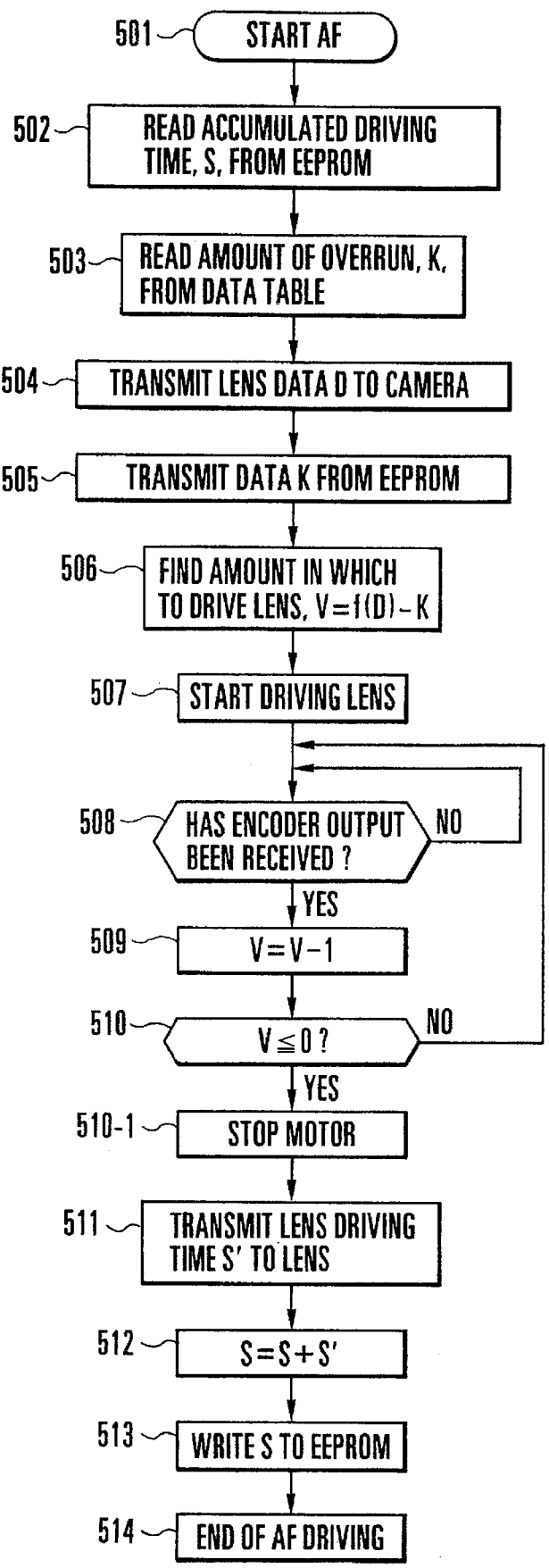
FIG. 9 is a flowchart showing the respective operations of the lens and camera microcomputers of FIG. 7, which include the step of memorizing the accumulated driving time of a focusing lens.

The respective operations of the lens unit 19 and the camera 18 (i.e., the respective operations of the lens microcomputer 16 and the camera microcomputer 10) will be described below in detail with reference to the flowchart of FIG. 9.

If an instruction to start automatic focusing is inputted to the camera 18 by an external manipulation, the camera microcomputer 10 transmits a data transmission request to the lens microcomputer 16 via the contact and also activates the distance measuring unit 21 (Step 501). The lens microcomputer 16 reads the accumulated lens driving time S from the EEPROM 17 (Step 502), and finds the amount of overrun, K, from an internal data table (Step 503). Then, the lens microcomputer 16 transmits lens data D and the amount of overrun, K, to the camera microcomputer 10 in that order (Steps 504 and 505). The camera microcomputer 10 calculates the amount V in which to drive the focusing lens 11, by using the function f, on the basis of the output of the distance measuring unit 21 and the transmitted lens data. The camera microcomputer 10 then subtracts the amount of overrun K from the amount V in which to drive the focusing lens 11, thereby finding a new amount V in which to drive the focusing lens 11 (Step 506). The camera microcomputer 10 starts driving the focusing lens 11 (Step 507).

Subsequently, the camera microcomputer 10 monitors the output of the encoder 12 at all times (Step 508). If the output of the encoder 12 switches from the high level to the low level or vice versa, the camera microcomputer 10 performs a computation on V−1 (Step 509). Then, it is confirmed whether the relation of V≦0 is satisfied (Step 510). If V>0, Steps 508 and 509 are repeated. If the relation of V≦0 is satisfied, the camera microcomputer 10 stops the motor 14 (Step 510-1) and transmits a lens driving time S' measured during this lens driving operation to the lens microcomputer 16 (Step 511). The lens microcomputer 16, which has received the lens driving time S', adds the lens driving time S' to the accumulated driving time S (Step 512). Then, the lens microcomputer 16 writes a new accumulated driving time S to the EEPROM 17 (Step 513). The camera microcomputer 10 brings the process to an end (Step 514).

The type in which the accumulated number of times of driving is stored in the EEPROM 17 will be described below with reference to FIG. 7.

If an instruction to execute automatic focusing is inputted to the camera microcomputer 10 by an external manipulation, the camera microcomputer 10 outputs a data transmission request to the lens microcomputer 16 and starts a distance measuring operation by means of the distance measuring unit 21.

The lens microcomputer 16 transmits lens data to the camera microcomputer 10 in response to the data transmission request, and then reads the past accumulated number of times of driving from the EEPROM 17, compares the read, past accumulated number of times of driving with the data table provided in the lens microcomputer 16 to determine the amount of overrun, and transmits the amount of overrun to the camera microcomputer 10.

When completing the distance measuring operation, the camera microcomputer 10 computes an amount in which to drive the focusing lens 11, on the basis of the transmitted lens data and the amount of overrun, and drives the motor 14 by means of the driver circuit 15. The power of the motor 14 is transmitted to the focusing lens 11 via the speed reducer 20, the mount connector (not shown) and the lens-side speed reducer 13, and works as a force for driving the focusing lens 11. After that, if the camera microcomputer 10 detects the completion of the driving of the focusing lens 11, the camera microcomputer 10 transmits the detection result to the lens microcomputer 16.

The lens microcomputer 16 increments the accumulated lens driving time S by one and writes the result to the EEPROM 17. Also, the camera microcomputer 10 completes driving the focusing lens 11.

Figure 10:
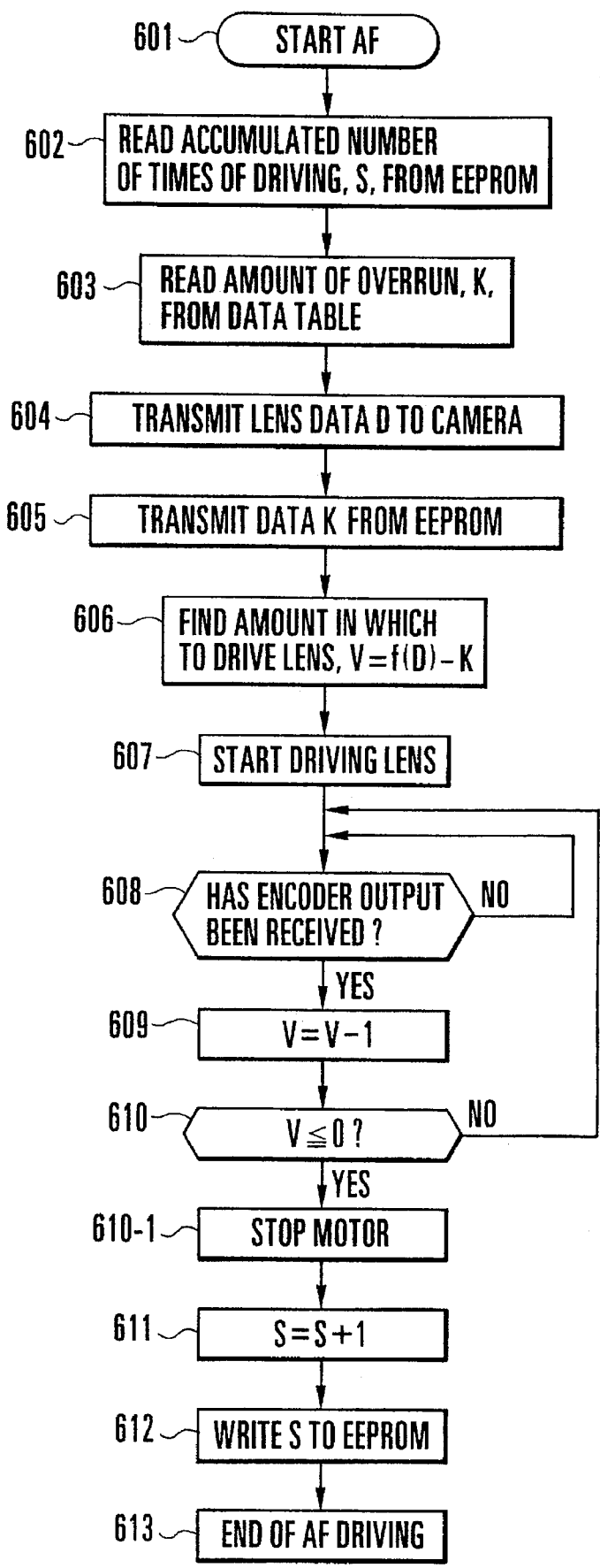
FIG. 10 is a flowchart showing the respective operations of the lens and camera microcomputers of FIG. 7, which include the step of memorizing the accumulated number of times of driving of the focusing lens.

The respective operations of the lens unit 19 and the camera 18 (i.e., the respective operations of the lens microcomputer 16 and the camera microcomputer 10) will be described below in detail with reference to the flowchart of FIG. 10.

If an instruction to start automatic focusing is inputted to the camera 18 by an external manipulation, the camera microcomputer 10 transmits a data transmission request to the lens microcomputer 16 via the contact and also activates the distance measuring unit 21 (Step 601). The lens microcomputer 16 reads the accumulated number of times of driving, S, from the EEPROM 17 (Step 602), and finds the amount of overrun, K, from the internal data table (Step 603). Then, the lens microcomputer 16 transmits the lens data D and the amount of overrun, K, to the camera microcomputer 10 in that order (Steps 604 and 605). The camera microcomputer 10 calculates the amount V in which to drive the focusing lens 11, by using the function f, on the basis of the output of the distance measuring unit 21 and the transmitted lens data. The camera microcomputer 10 then subtracts the amount of overrun K from the amount V in which to drive the focusing lens 11, thereby finding a new amount V in which to drive the focusing lens 11 (Step 606). The camera microcomputer 10 starts driving the focusing lens 11 (Step 607).

Subsequently, the camera microcomputer 10 monitors the output of the encoder 12 at all times (Step 608). If the output of the encoder 12 switches from the high level to the low level or vice versa, the camera microcomputer 10 performs a computation on V−1 (Step 609). Then, it is confirmed whether the relation of V≦0 is satisfied (Step 610). If V>0, Steps 608 and 609 are repeated. If the relation of V≦0 is satisfied, the camera microcomputer 10 stops the motor 14 (Step 610-1), and informs the lens microcomputer 16 of the completion of the driving of the focusing lens 11 and the lens microcomputer 16 increments the accumulated number of times of driving by one (Step 611). Then, the lens microcomputer 16 writes the accumulated number of times of driving S to the EEPROM 17 (Step 612). The camera microcomputer 10 brings the lens driving flow to an end (Step 613).

(Third Embodiment)

Figure 11:
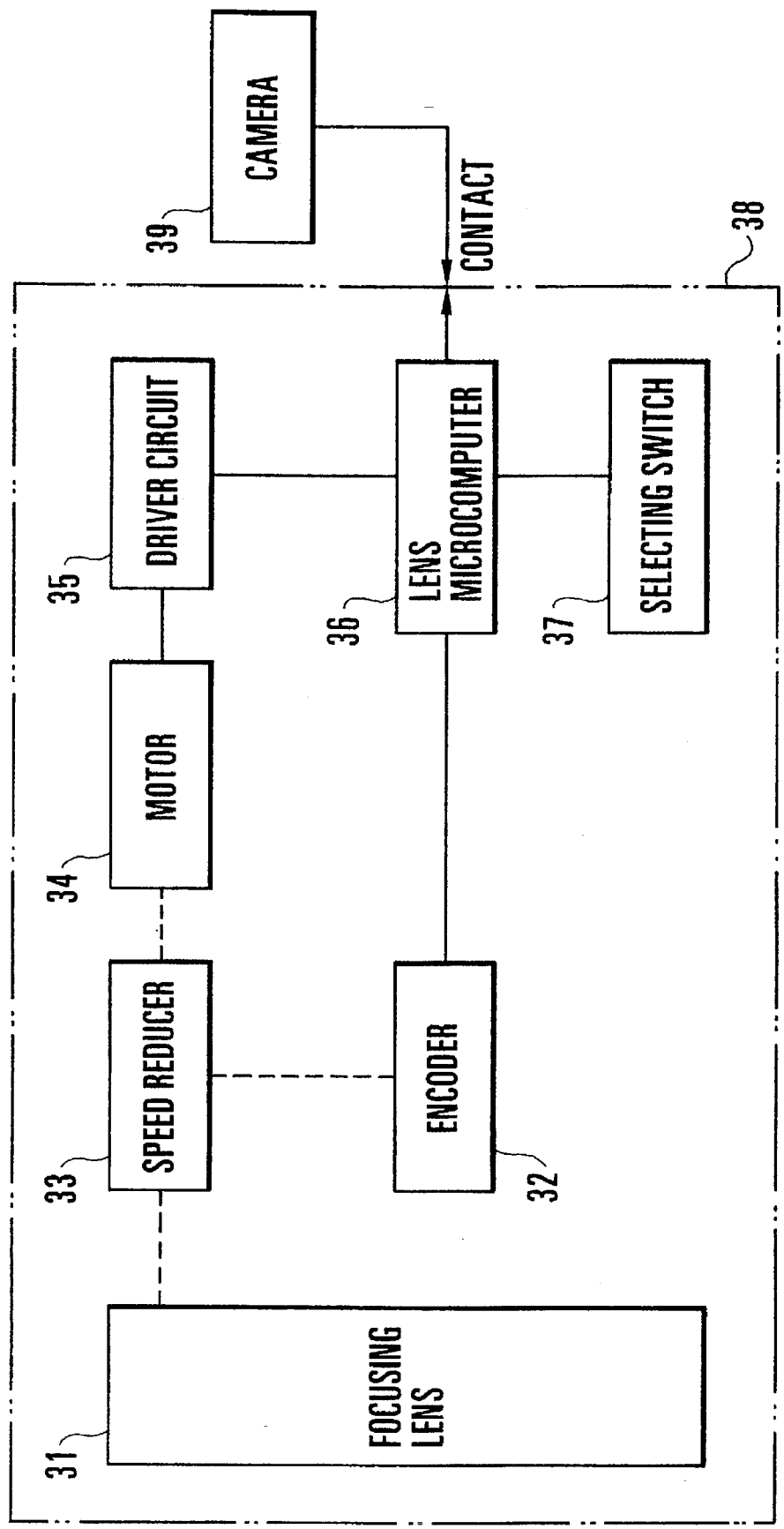
FIG. 11 is a block diagram showing the arrangement of a camera system provided with an automatic focusing device according to a third embodiment of the present invention.

FIG. 11 is a block diagram showing the arrangement of a camera system provided with an automatic focusing device according to a third embodiment of the present invention. In the third embodiment, a lens unit is provided with a selecting switch instead of an EEPROM.

The arrangement shown in FIG. 11 includes a focusing lens 31 which constitutes a focusing optical system, an encoder 32 for detecting the amount of driving of the focusing lens 31, a speed reducer 33 for decreasing the speed of rotation of and increasing the torque of a power source, a motor 34 which constitutes the power source for moving the focusing lens 31, a driver circuit 35 for driving the motor 34, a lens microcomputer 36 for controlling all elements of a lens unit 38, and a selecting switch 37 for selecting the amount of overrun of the focusing lens 31. The lens unit 38 is made up of the above-described elements, i.e., the focusing lens 31, the encoder 32, the speed reducer 33, the motor 34, the driver circuit 35, the lens microcomputer 36 and the selecting switch 37.

In FIG. 11, reference numeral 39 denotes a camera (body) which is arranged to transmit various commands or data to the lens unit 38 and control the lens unit 38 itself.

In FIG. 11, solid lines represent electrical connections, and dotted lines represent mechanical connections.

If an instruction to start automatic focusing is inputted to the camera 39 by an external manipulation, the camera 39 transmits a data transmission request to the lens microcomputer 36 and starts a distance measuring operation.

The lens microcomputer 36 transmits lens data to the camera 39 in response to the data transmission request, and waits for the next request.

When completing the distance measuring operation, the camera 39 computes an amount in which to drive the focusing lens 31, on the basis of the transmitted lens data, and transmits to the lens microcomputer 36 a lens driving request and the computed amount in which to drive the focusing lens 31.

When the lens microcomputer 36 receives the lens driving request and the computed amount in which to drive the focusing lens 31, the lens microcomputer 36 confirms the state of the selecting switch 37 and reads the amount of overrun from an internal data table (to be described later). Then, the lens microcomputer 36 subtracts the read amount of overrun from the amount in which to drive the focusing lens 31, which amount has been transmitted from the camera 39. The lens microcomputer 36 substitutes the resultant difference for a new amount in which to drive the focusing lens 31, and starts driving the focusing lens 31. Then, if the amount in which to driven the focusing lens 31 becomes zero or less, the lens microcomputer 36 brings the lens driving to an end.

FIG. 12 shows an example of the data table which is preset in the lens microcomputer 36.

As can be seen from FIG. 12, assuming that the amount in which to drive the focusing lens 31, which amount has been transmitted from the camera 39, is one hundred pulses and that the setting of the selecting switch 37 for switching the amount of overrun of the focusing lens 31 is "10", the amount of overrun is one pulse. Therefore, the lens microcomputer 36 determines that (100−1=99) pulses are an actual amount in which to drive the focusing lens 31.

The selecting switch 37 may also be of a type which utilizes a general contact or which is arranged to switch by short-circuiting a pattern formed on an electrical circuit board.

Figure 13:
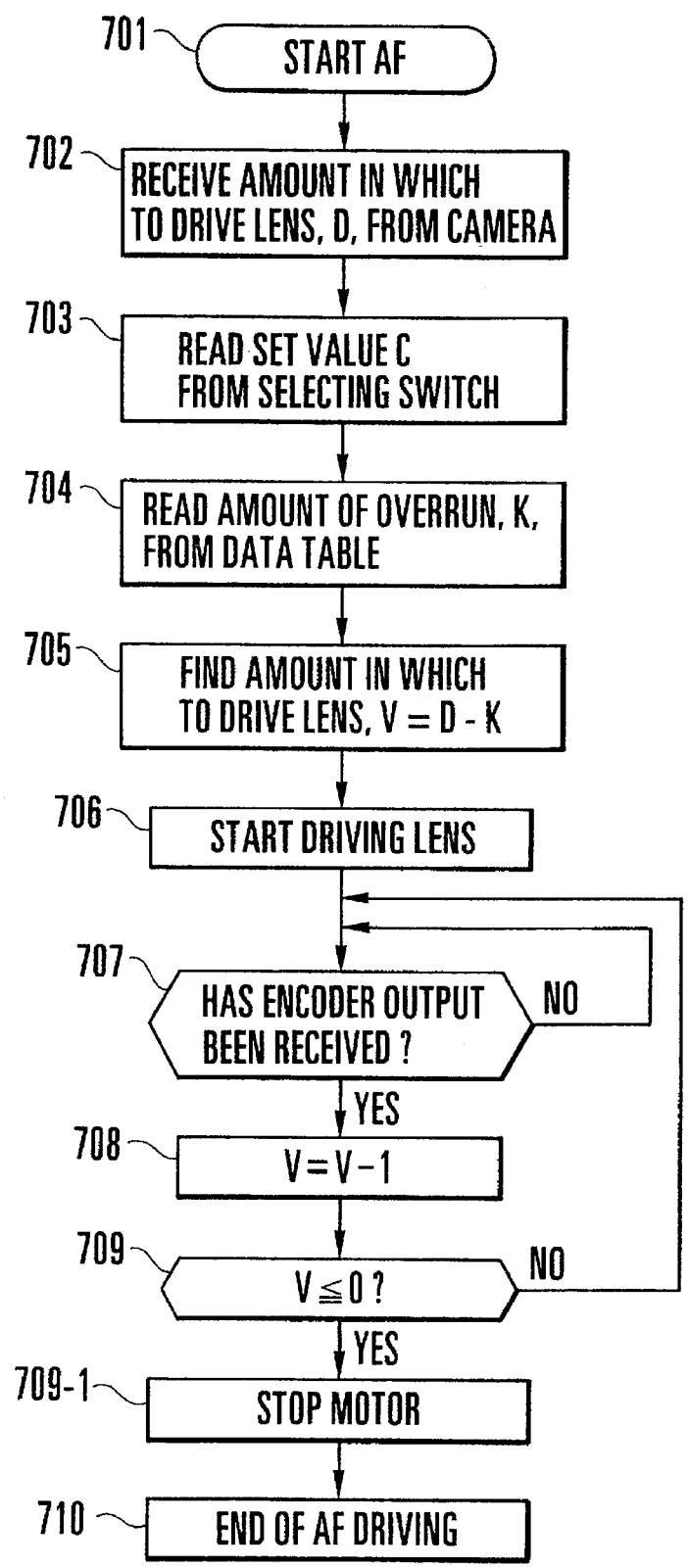
FIG. 13 is a flowchart showing the operation of an lens microcomputer of FIG. 11, which includes the step of determining the amount of overrun according to the state of setting of a selecting switch.

The operation of the lens unit 38 (the lens microcomputer 36) will be described below in detail with reference to the flowchart of FIG. 13.

If the lens microcomputer 36 receives from the camera 39 an instruction to drive the focusing lens 31 and the amount D in which to drive the focusing lens 31 (Steps 701 and 702), the lens microcomputer 36 reads a set value C of the selecting switch 37 (Step 703) and reads the amount of overrun, K, from the preset data table (refer to FIG. 12) (Step 704). Then, the lens microcomputer 36 subtracts the amount of overrun, K, from the amount D in which to drive the focusing lens 31, which amount D has been received from the camera 39, thereby finding the new amount V in which to drive the focusing lens 31 (Step 705). Then, the lens microcomputer 36 starts driving the focusing lens 31 (Step 706).

Subsequently, the lens microcomputer 36 monitors the output of the encoder 32 at all times (Step 707). If the output of the encoder 32 switches from the high level to the low level or vice versa, the lens microcomputer 36 performs a computation on V−1 (Step 708). Then, it is confirmed whether the relation of V≦0 is satisfied (Step 709). If V>0, Steps 707 and 708 are repeated. If the relation of V≦0 is satisfied, the lens microcomputer 36 stops the motor 34 and brings the lens driving flow to an end (Steps 709-1 and 710).

(Fourth Embodiment)

Figure 14:
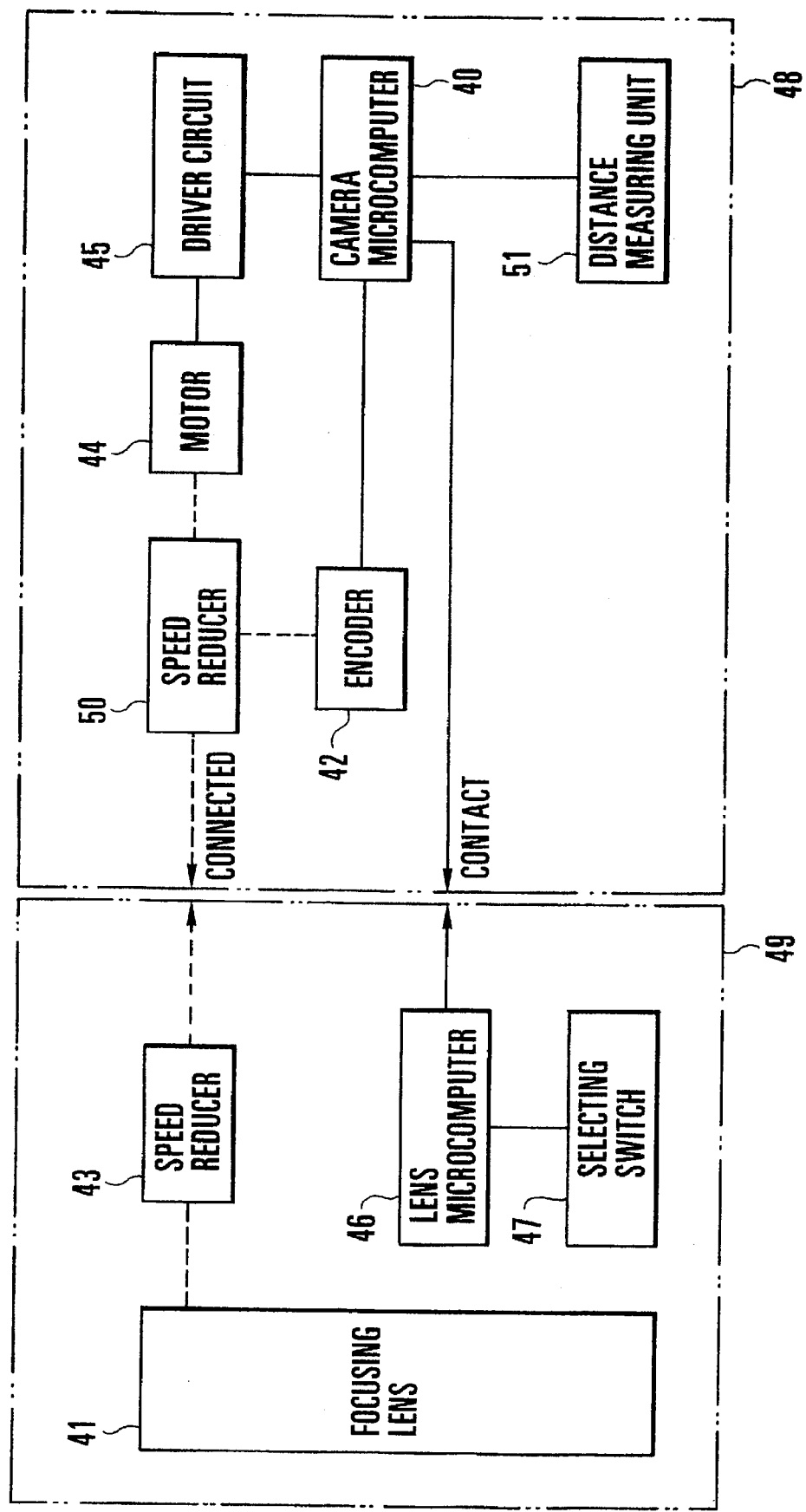
FIG. 14 is a block diagram showing the arrangement of a camera system provided with an automatic focusing device according to a fourth embodiment of the present invention.

FIG. 14 is a block diagram showing the arrangement of a camera system provided with an automatic focusing device according to a fourth embodiment of the present invention. In the fourth embodiment, a camera is provided with an actuator as well as a selecting switch for setting the amount of overrun.

The arrangement shown in FIG. 14 includes a camera microcomputer 40 for controlling all elements of a camera 48, a focusing lens 41 which constitutes a focusing optical system, an encoder 42 for detecting the amount of driving of the focusing lens 41, a speed reducer 43 for decreasing the speed of rotation of and increasing the torque of a power source provided in the camera 48, the power source being connected to the speed reducer 43 via a mount, a motor 44 which constitutes the power source for moving the focusing lens 41, a driver circuit 45 for driving the motor 44, a lens microcomputer 46 for controlling all elements of a lens unit 49, and a selecting switch 47 for setting the amount of overrun of the focusing lens 41, the selecting switch 47 being arranged to be manually switchable.

The camera 48 transmits various commands or data to the lens unit 49 to control the lens unit 49 itself. A speed reducer 50 and a distance measuring unit 51 for automatic focusing are incorporated in the camera 48.

In FIG. 14, solid lines represent electrical connections, and dotted lines represent mechanical connections.

If an instruction to execute automatic focusing is inputted to the camera microcomputer 40 by an external manipulation, the camera microcomputer 40 outputs a data transmission request to the lens microcomputer 46 and starts a distance measuring operation by means of the distance measuring unit 51.

The lens microcomputer 46 transmits lens data to the camera microcomputer 40 in response to the data transmission request, and then confirms the state of the selecting switch 47 provided in the lens unit 49. Also, the lens microcomputer 46 determines the amount of overrun by referring to an internal data table and transmits the amount of overrun to the camera microcomputer 40.

When completing the distance measuring operation, the camera microcomputer 40 computes an amount in which to drive the focusing lens 41, on the basis of the transmitted lens data and the amount of overrun, and drives the motor 44 by means of the driver circuit 45. The power of the motor 44 is transmitted to the focusing lens 41 via the speed reducer 50, a mount connector (not shown) and the lens-side speed reducer 43, and works as a force for driving the focusing lens 41. After that, if the amount in which to drive the focusing lens 41 becomes zero or less, the camera microcomputer 40 brings the lens driving to an end.

Figure 15:
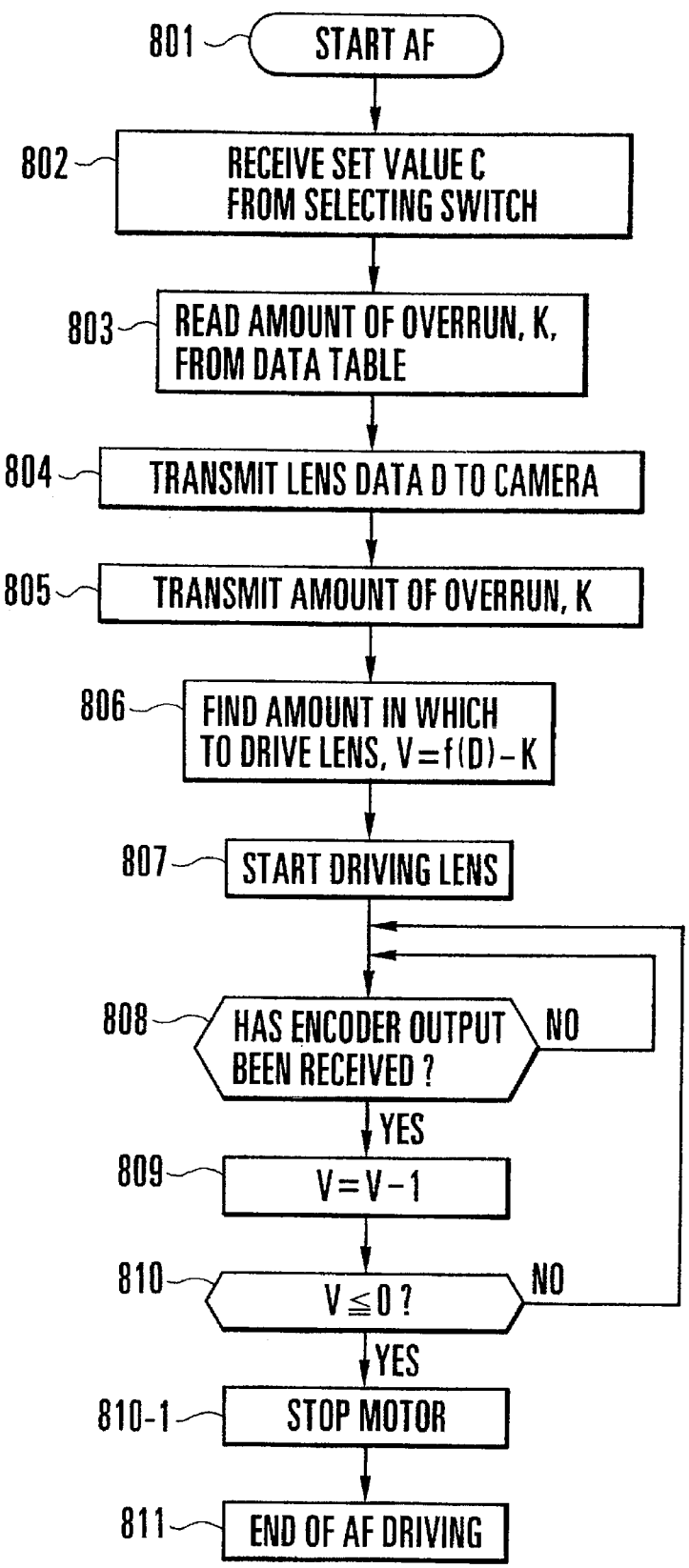
FIG. 15 is a flowchart showing the respective operations of camera and lens microcomputers of FIG. 14, which include the step of determining the amount of overrun according to the state of setting of a selecting switch.

The respective operations of the lens unit 49 and the camera 48 (i.e., the respective operations of the lens microcomputer 46 and the camera microcomputer 40) will be described below in detail with reference to the flowchart of FIG. 15.

If an instruction to start automatic focusing is inputted to the camera 48 by an external manipulation, the camera microcomputer 40 transmits a data transmission request to the lens microcomputer 46 via a contact and also activates the distance measuring unit 51 (Step 801). The lens microcomputer 46 reads the set value C from the selecting switch 47 provided in the lens unit 49 (Step 802), and finds the amount of overrun, K, from the internal data table (Step 803). Then, the lens microcomputer 46 transmits the lens data D and the amount of overrun, K, to the camera microcomputer 40 in that order (Steps 804 and 805).

The camera microcomputer 40 calculates the amount V in which to drive the focusing lens 41, by using the function f, on the basis of the output of the distance measuring unit 51 and the transmitted lens data. The camera microcomputer 40 then subtracts the amount of overrun, K, from the amount V in which to drive the focusing lens 41, thereby finding a new amount V in which to drive the focusing lens 41 (Step 806).

The camera microcomputer 40 starts driving the focusing lens 41 (Step 807). Subsequently, the camera microcomputer 40 monitors the output of the encoder 42 at all times (Step 808). If the output of the encoder 42 switches from the high level to the low level or vice versa, the camera microcomputer 40 performs a computation on V−1 (Step 809). Then, it is confirmed whether the amount V in which to drive the focusing lens 41 is not greater than zero (Step 810). If V≦0 is confirmed, the camera microcomputer 40 stops the motor 44 and brings the lens driving flow to an end (Steps 810-1 and 811).

According to each of the above-described embodiments, there is provided a lens driving device which includes a lens unit containing either an EEPROM for storing various histories or data or a selecting switch (which is manually switchable) for selecting the amount of overrun. Such a lens driving device is capable of predicting mechanical error factors due to a long-term use of the lens unit and automatically correcting a mechanical error or enabling easy maintenance for correcting the mechanical error, thereby making it possible to maintain its initial operating state at all times. Although each of the above-described embodiments is arranged to find an amount in which to drive a focusing lens, instead, it is also possible to adopt an arrangement for finding a target lens position.

What is claimed is:

1. A driving arrangement or a lens driving device including said driving arrangement, said driving arrangement being arranged to receive driving information about a target amount of driving or a target position of driving and drive a target member by the target amount of driving or toward the target position of driving according to the driving information, comprising:

(A) a driving power source for driving the target member;
   (B) a computing circuit for computing use status of said driving arrangement corresponding to the total accumulated use of said driving arrangement over the lifetime of raid driving arrangement to provide use status information; and
   (C) a control circuit for executing control of an amount by which or a position toward which the target member is to be currently driven by said driving power source, according to the use status information provided by said computing circuit and the driving information.

2. A driving arrangement or a lens driving device including said driving arrangement according to claim 1, wherein said control circuit executes control of the amount by which or the position toward which the target member is to be currently driven by said driving power source, according to driving information obtained by correcting the driving information by the amount of driving corresponding to the use status information.

3. A driving arrangement or a lens driving device including said driving arrangement according to claim 1, wherein the use status is a time period of use.

4. A driving arrangement or a lens driving device including said driving arrangement according to claim 2, wherein the use status is a time period of use.

5. A driving arrangement or a lens driving device including said driving arrangement according to claim 1, wherein the use status is the number of times of use.

6. A driving arrangement or a lens driving device including said driving arrangement according to claim 2, wherein the use status is the number of times of use.

7. A driving arrangement or a lens driving device including said driving arrangement according to claim 1, wherein said lens driving device is an automatic focusing device.

8. A driving arrangement or a lens driving device including said driving arrangement, said driving arrangement being arranged to receive driving information about a target amount of driving or a target position of driving and drive a target member by the target amount of driving or toward the target position of driving according to the driving information, comprising:

(A) a driving power source for driving the target member;
   (B) a circuit for providing a use status information which corresponds to the total accumulated use of said driving arrangement over the lifetime of said driving arrangement; and
   (C) a control circuit for executing control of an amount by which or a position toward which the target member is to be currently driven by said driving power source, according to the use status information provided by said circuit and the driving information.

9. A driving arrangement or a lens driving device including said driving arrangement according to claim 8, wherein the use status is a time period of use.

10. A driving arrangement or a lens driving device including said driving arrangement according to claim 8, wherein the use status is the number of times of use.

* * * * *

UNITED STATES PATENT AND TRADEMARK OFFICE
CERTIFICATE OF CORRECTION

PATENT NO. : 5,652,923
DATED : July 29, 1997
INVENTOR(S) : Kawanami, Akihiro

It is certified that error appears in the above-identified patent and that said Letters Patent is hereby corrected as shown below:

Col. 5, line 47, delete "(step 209.1)" and insert -- (Step 209-1) --.

Signed and Sealed this

Fourteenth Day of July, 1998

*Attest:*

*Attesting Officer*

BRUCE LEHMAN

Commissioner of Patents and Trademarks